US010209006B2

(12) United States Patent
Wang et al.

(10) Patent No.: US 10,209,006 B2
(45) Date of Patent: Feb. 19, 2019

(54) FLUIDIZED CALCINER

(71) Applicant: MITSUBISHI MATERIALS CORPORATION, Chiyoda-ku (JP)

(72) Inventors: Junzhu Wang, Naka (JP); Yoshinori Takayama, Naka (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 357 days.

(21) Appl. No.: 15/119,429

(22) PCT Filed: Sep. 18, 2014

(86) PCT No.: PCT/JP2014/004795
§ 371 (c)(1),
(2) Date: Aug. 17, 2016

(87) PCT Pub. No.: WO2015/128910
PCT Pub. Date: Sep. 3, 2015

(65) Prior Publication Data
US 2017/0219287 A1 Aug. 3, 2017

(30) Foreign Application Priority Data

Feb. 28, 2014 (JP) .................................. 2014-038119

(51) Int. Cl.
*F27B 7/20* (2006.01)
*C04B 7/45* (2006.01)
(Continued)

(52) U.S. Cl.
CPC .............. *F27B 7/2033* (2013.01); *C04B 7/45* (2013.01); *F27B 7/38* (2013.01); *F27D 17/004* (2013.01)

(58) Field of Classification Search
CPC ........ F27B 7/2033; F27B 7/38; F27D 17/004; C04B 7/45
(Continued)

(56) References Cited

U.S. PATENT DOCUMENTS 3,969,068 A * 7/1976 Miller ..................... C03B 5/235
432/13
4,025,295 A * 5/1977 Touborg .................... C04B 2/12
432/14

(Continued)

FOREIGN PATENT DOCUMENTS

DE 102010054648 A1 * 7/2012 ........... F27D 17/004
JP 59-46120 A 3/1984
(Continued)

OTHER PUBLICATIONS

International Search Report dated Dec. 9, 2014 in PCT/JP2014/004795 filed Sep. 18, 2014.

*Primary Examiner* — Stephen M Gravini
(74) *Attorney, Agent, or Firm* — Oblon, McClelland, Maier & Neustadt, L.L.P.

(57) ABSTRACT

The present invention provides a fluidized calciner which can perform sufficient calcination by reducing a rate of unburned fuel at an outlet of the fluidized calciner while preventing occlusion in a preheater. In the present invention, plural pulverized coal blowing lines (3), raw material chute (4) of cement raw material, and first to fourth air introduction pipes (5a to 5d) are connected to a bottom side wall of a tubular furnace body (2) whose upper end portion is closed by a top plate (2b); a fluidizing air blowing port (2a) adapted to blow in fluidizing air is disposed at a bottom of the furnace body (2); an exhaust gas duct (6) is connected to a top side wall of the furnace body located above the first and/or second air introduction pipes (5a, 5b) by being spaced away from the top plate (2b); and blowing ports (3a)
(Continued)

of the pulverized coal blowing lines are disposed below suction ports of respective air introduction pipes (5a to 5d) but above the fluidizing air blowing port (2a), and at least one of the blowing ports (3a) is placed below the third or fourth air introduction pipe (5c or 5d).

4 Claims, 7 Drawing Sheets

(51) Int. Cl.
*F27B 7/38* (2006.01)
*F27D 17/00* (2006.01)

(58) Field of Classification Search
USPC .......................................... 34/368; 110/265
See application file for complete search history.

(56) References Cited

U.S. PATENT DOCUMENTS

| | | | | |
|---|---|---|---|---|
| 4,372,784 A * | 2/1983 | Hess | ...................... | F27B 7/2033 106/759 |
| 4,475,472 A * | 10/1984 | Adrian | .................. | F23C 10/002 110/211 |
| 4,993,332 A * | 2/1991 | Boross | ....................... | F23C 1/00 110/204 |
| 5,044,942 A * | 9/1991 | Chatwani | .................. | C04B 7/45 432/100 |
| 5,379,705 A * | 1/1995 | Takada | ....................... | F23G 5/30 110/229 |
| 5,575,085 A * | 11/1996 | Groombridge | .......... | C10B 33/12 110/101 C |
| 5,782,011 A * | 7/1998 | Boersen | .................... | B01D 1/18 34/366 |
| 5,944,513 A * | 8/1999 | Yokota | .................... | F27B 15/00 432/106 |
| 6,045,688 A * | 4/2000 | Ruottu | .................... | B01J 8/0055 208/113 |
| 6,098,307 A * | 8/2000 | Pikus | ...................... | F26B 17/20 34/368 |
| 8,075,686 B2 * | 12/2011 | Ichihara | .................... | B09B 3/00 106/739 |
| 8,347,525 B2 * | 1/2013 | Gerde | ...................... | B01D 1/18 128/203.15 |
| 2006/0169181 A1 * | 8/2006 | Youn | ...................... | C04B 2/108 106/740 |
| 2007/0163476 A1 * | 7/2007 | Comrie | ..................... | C10L 9/10 110/345 |
| 2013/0036622 A1 * | 2/2013 | Abraham | ................ | B01J 8/1872 34/368 |
| 2014/0290251 A1 * | 10/2014 | Sugasawa | ................ | F23K 1/00 60/670 |
| 2015/0307396 A1 * | 10/2015 | Takayama | ............... | F27B 15/14 432/58 |
| 2017/0219287 A1 * | 8/2017 | Wang | ........................ | C04B 7/45 |

FOREIGN PATENT DOCUMENTS

| | | | | |
|---|---|---|---|---|
| JP | 8-231254 A | | 9/1996 | |
| JP | 2014141396 A * | | 8/2014 | .............. F27B 15/14 |
| JP | WO 2015128910 A1 * | | 9/2015 | ................ C04B 7/45 |
| JP | 6187315 B2 * | | 8/2017 | ................ C04B 7/45 |
| WO | WO 2012091576 A1 * | | 7/2012 | ................ F27B 3/26 |

\* cited by examiner (a)

(b)

(c)

(d)

(e)

(f)

(a)

(b)

(c)

(d)

(e)

FLUIDIZED CALCINER

TECHNICAL FIELD

The present invention relates to a fluidized calciner which can reduce a rate of unburned fuel at a calciner outlet by optimizing a supply position for pulverized coal.

BACKGROUND ART

Conventionally, as shown in FIG. 7, in a cement manufacturing facility 10 equipped with a fluidized calciner 11, raw material heated through heat exchange with hot gas in a suspension preheater 7 is discharged from a lower-stage cyclone 8 of the suspension preheater 7, part of the heated raw material is dispersively loaded into a rotary kiln exhaust gas duct 9, and the remainder is supplied to a raw material supply chute 12 of the fluidized calciner 11.

In the fluidized calciner 11, air is blown in through a fluidizing air blowing port 13, air chamber 13a, and air dispersion plate 14, forming a fluidizing bed 15. In so doing, the air causes part of the fuel supplied through a pulverized coal supply pipe 16 to combust, makes raw material to be calcined stay in the fluidizing bed 15 for a predetermined period of time, and then causes the raw material to scatter to a free board 17 located above the fluidizing bed 15. Also, hot air from a high-temperature clinker cooler 18 is sucked in a substantially tangential direction through a suction port 19 and the fuel supplied through a pulverized coal supply pipe 16 combusts also on the free board 17. Consequently, the raw material loaded through the upper raw material supply chute 12 and the raw material scattered upward from a surface of the fluidizing bed 15 are calcined efficiently and quickly.

Then, all the calcined raw material enters a separation cyclone 21 by being accompanied by calciner exhaust gas. On the other hand, the raw material dispersively loaded into the rotary kiln exhaust gas duct 9 is also partly calcined by high-temperature rotary kiln exhaust gas and enters the separation cyclone 21 together with the rotary kiln exhaust gas. Furthermore, calcination raw material collected in the separation cyclone 21 is introduced into the rotary kiln 20 through a raw material chute 22.

On the other hand, hot air generated in a clinker cooler 18 is sucked into the rotary kiln 20 and fluidized calciner 11 by suction force of an induction fan 23. However, an amount of suction into the rotary kiln 20 with small draft resistance becomes excessive, and thus cross sectional area is reduced in part of the rotary kiln exhaust gas duct 9, and the amount of suction into the fluidized calciner 11 is adjusted by a damper 24.

Incidentally, in fluidized calciners, it is common practice to use a solid fuel such as coal as a fuel for calcination of cement raw material. Among solid fuels, bituminous coal with good combustion quality is used by being pulverized into fine powder. However, for effective utilization of limited resources, the use of a wide variety of fuels such as coal and oil coke with poor combustion quality is needed.

On the other hand, in the above mentioned conventional fluidized calciner, pulverized coal is conventionally blown into a thick fluidizing bed formed of cement raw material in the bottom from the pulverized coal supply pipe 16 connected to one place on a flank of a furnace body, the pulverized coal tends to flow toward an outlet from the free board 17, with an uneven pulverized coal concentration without being dispersed sufficiently.

Consequently, there is a problem in that oxygen becomes deficient in locations where the concentration of pulverized coal is high while conversely becoming excessive in locations where the concentration is low, causing uneven oxygen consumption and thus incomplete combustion in the furnace, and resulting in a reduced char reaction rate.

In addition, there is a problem in that the char reaction rate of pulverized coal at an outlet of the fluidized calciner 11 becomes low, causing a large amount of unburned carbon to remain in an exhaust gas duct and combust in the preheater 7 and thereby increasing gas temperature in the preheater 7, producing adherents in the cyclone and raw material chute and thereby frequently causing occlusion of a cyclone inlet and outlet and ducts, and obstructing operation.

On the other hand, Patent Literature 1 described below proposes a fluidized calciner for cement raw material, including: a tubular furnace body whose cylinder axis direction corresponds to an up-down direction; an air dispersion plate installed substantially horizontally at a bottom of the furnace body and an air chamber installed under the air dispersion plate; a raw material supply chute adapted to supply raw material on an upper side of the air dispersion plate; a fuel supply nozzle adapted to supply solid fuel to a fluidizing bed on the upper side of the air dispersion plate; and a secondary air duct adapted to supply secondary air (introduced air) to the upper side of the air dispersion plate, wherein the fuel supply nozzle is connected to the furnace body by sloping downward at an angle of 20 degrees or above and being deflected to a tangential side from a centripetal direction.

The above-mentioned conventional fluidized calciner for cement raw material calcinates the raw material through combustion of fuel, but a connecting location of the fuel supply nozzle and the like are based on empirical values and the presence or absence and the like of raw material concentration and gas (especially $O_2$) concentration distributions in the fluidized calciner is not taken into consideration, and consequently there is a problem in that when poorly combustible pulverized coal of coal, coke, and the like is used as a fuel, sufficient calcination cannot be performed and occlusion of ducts may obstruct operation.

Regarding refractories such as the furnace body, there is a problem in that if combustion performance is too high, temperatures around furnace walls will locally become too high, which is highly likely to cause burnout.

CITATION LIST

Patent Literature

Patent Literature 1: Japanese Patent Laid-Open No. 8-231254

SUMMARY OF INVENTION

Technical Problem

The present invention has been made in view of the above circumstances and has an object to provide a fluidized calciner which can perform sufficient calcination by reducing a rate of unburned fuel at an outlet of the fluidized calciner while preventing occlusion in a preheater even when poorly combustible pulverized coal of coal, coke, and the like is used as a fuel.

Solution to Problem

To solve the above problem, the present invention as recited in claim 1 provides a fluidized calciner, wherein a plurality of pulverized coal blowing lines adapted to blow fuel into a furnace body, a raw material chute adapted to load cement raw material into the furnace body, and first to fourth air introduction pipes placed sequentially at intervals and adapted to provide introduced air into the furnace body are connected to a bottom side wall of the tubular furnace body whose axis direction corresponds to an up-down direction and whose upper end portion is closed by a top plate; a fluidizing air blowing port adapted to blow fluidizing air into the furnace body is disposed at a bottom of the furnace body; an exhaust duct adapted to cause combustion gas in the furnace body containing cement raw material to flow out is connected to a top side wall of the furnace body located above the first and/or second air introduction pipes by being spaced away from the top plate; blowing ports of the pulverized coal blowing lines are disposed below suction ports of the respective air introduction pipes but above the fluidizing air blowing port; and the blowing port of one of the pulverized coal blowing lines is placed below the third or fourth air introduction pipe.

The invention recited in claim 2 provides the invention recited in claim 1, wherein the blowing ports of the pulverized coal blowing lines are disposed at two locations.

Furthermore, the invention recited in claim 3 provides the invention recited in claim 1 or 2, wherein the raw material chute is placed next to the first air introduction pipe and the blowing ports of the pulverized coal blowing lines are placed below the third air introduction pipe opposed to the first air introduction pipe in a radial direction.

Advantageous Effects of Invention

According to the invention recited in any of claims 1 to 3, since the upper end portion of the tubular furnace body is closed by the top plate and the exhaust gas duct adapted to cause air in the furnace body to flow out is connected to the top side wall of the furnace body by being spaced away from the top plate, a mixing chamber for a mixed fluid of the cement raw material, pulverized coal, and furnace gas flowing to the exhaust gas duct is formed in upper part of the furnace body.

Thus, in the mixing chamber, combustion quality can be improved by facilitating mixing of the furnace gas and pulverized coal. Also, heat exchange among the cement raw material, pulverized coal, and furnace gas is facilitated by the mixing, making it possible to improve a decarbonation rate of the cement raw material.

Now, if the exhaust gas duct is simply connected to the top side wall of the furnace body as described above, concentration of the pulverized coal in the furnace becomes high on the side of the side wall to which the exhaust gas duct is connected due to a suction force from the exhaust gas duct and becomes relatively low in locations away from the side wall. Therefore, if the pulverized coal is blown in through a single spot, dispersibility of the pulverized coal might further degrade due to a synergistic effect of the two.

In contrast, according to the present invention, since the blowing ports of the plural pulverized coal blowing lines are disposed below the suction ports of the respective air introduction pipes but above the fluidizing air blowing port and the blowing port of one of the pulverized coal blowing lines is placed at a position spaced away from the position where the exhaust duct is connected, the pulverized coal can be dispersed effectively in the furnace, improving combustion.

Consequently, it is possible to reduce the rate of unburned fuel at an outlet in upper part of the furnace body, by coordinating the connecting location of the exhaust gas duct, keep down temperature in the preheater and prevent occlusion of the cyclone, raw material chute, and preheater, and thereby perform smooth and proper operation.

Furthermore, according to the invention recited in claim 2, as can be seen from computational fluid dynamics calculations described later, by disposing the pulverized coal blowing ports at two locations in total with at least one pulverized coal blowing port placed at a position spaced away from the position where the exhaust duct is connected, it is possible to obtain effects substantially equivalent to when blowing ports are disposed below all the first to fourth air introduction pipes (at four locations in total). This keeps down equipment cost and makes management easier, and is thus economical.

Furthermore, according to the invention recited in claim 3, when the raw material chute is placed next to the first air introduction pipe, as the blowing ports for the pulverized coal are placed below the third air introduction pipe opposed to the first air introduction pipe in a radial direction, the decarbonation rate of the cement raw material as well as the char reaction rate can be improved further.

BRIEF DESCRIPTION OF DRAWINGS

FIG. 3 FIGS. 3(a) to 3(f) are layout plans of blowing ports for pulverized coal in examples of the present invention.

FIG. 4 FIGS. 4(a) to 4(e) are layout plans of blowing ports for pulverized coal in comparative examples.

DESCRIPTION OF EMBODIMENT

Figure 1:
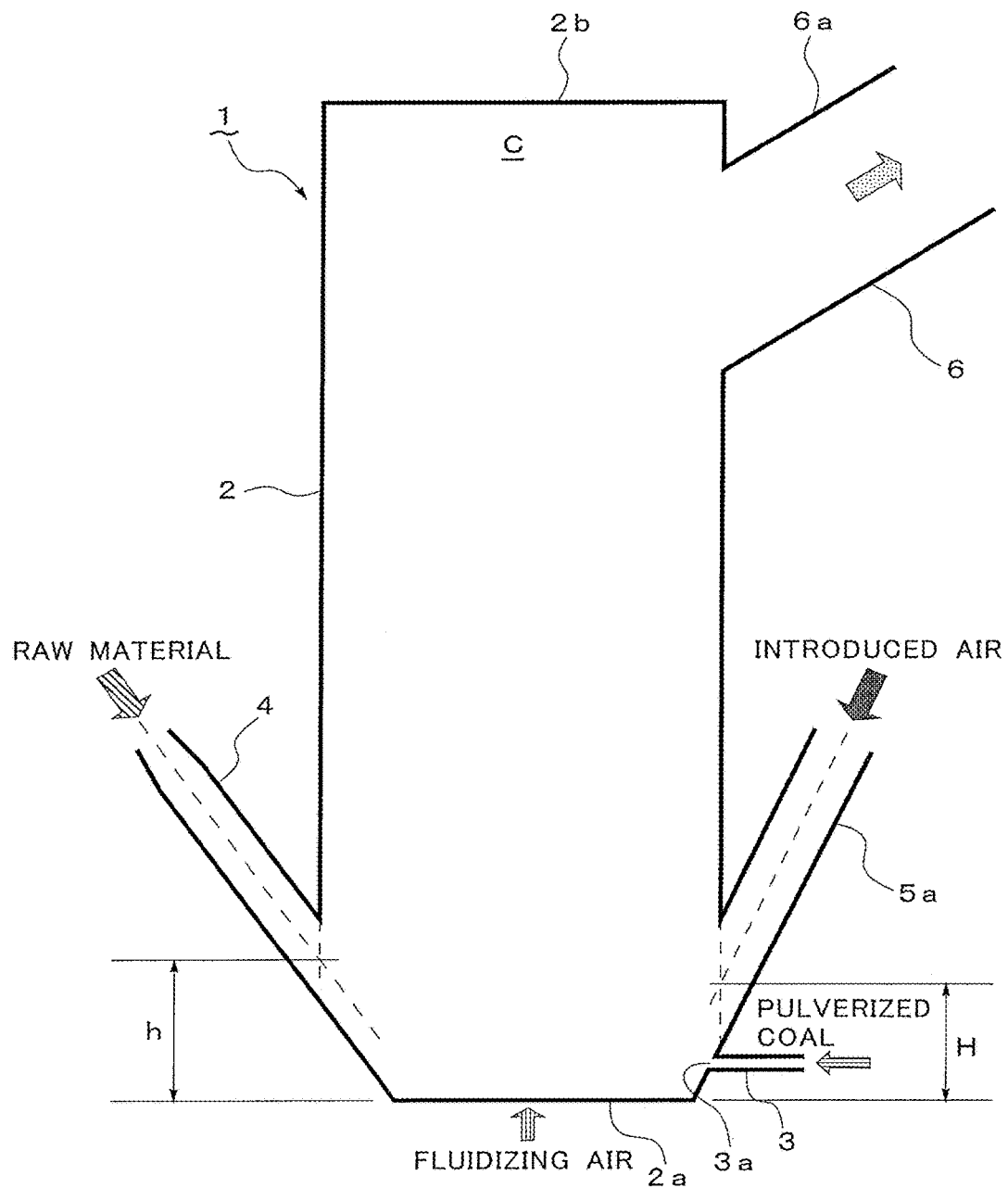
FIG. 1 is a longitudinal sectional view showing an embodiment of a fluidized calciner according to the present invention.
Figure 3:
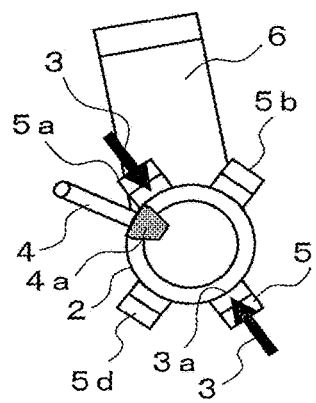
Figure 3:
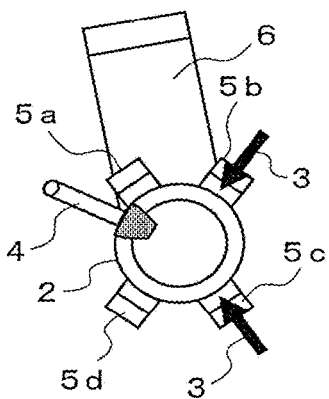
Figure 3:
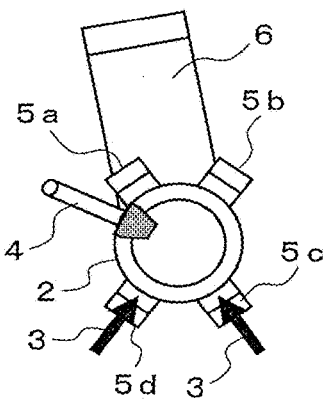
Figure 3:
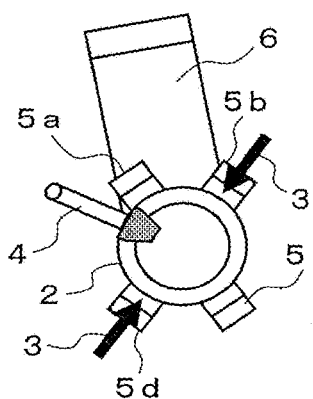
Figure 3:
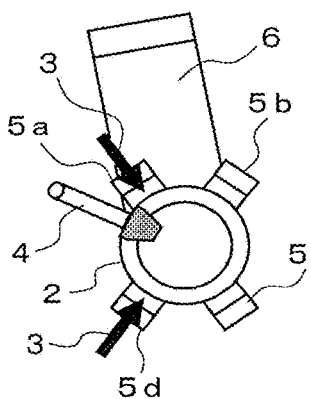
Figure 3:
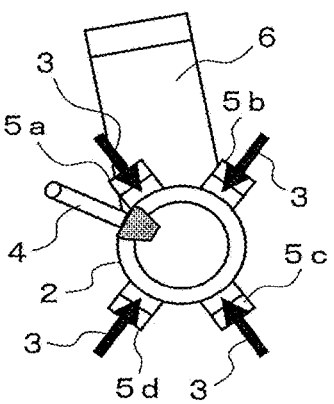

FIGS. 1 and 3 show an embodiment of a fluidized calciner according to the present invention.

In FIGS. 1 and 3, the fluidized calciner 1 according to the present embodiment is generally configured such that a furnace body 2 is connected with plural pulverized coal blowing lines 3 adapted to blow fuel into the furnace body 2, a raw material chute 4 adapted to load cement raw material, first to fourth air introduction pipes 5a to 5d adapted to flow introduced air into the furnace body 2 and an exhaust duct 6 adapted to cause combustion gas in the furnace body 2 containing cement raw material to flow out and that a fluidizing air blowing port 2a adapted to blow fluidizing air into the furnace body 2 is formed at a bottom of the furnace body 2.

Here, the furnace body 2 is formed into a cylindrical shape 5.0 to 6.5 m in inside diameter and placed with an axis direction facing an up-down direction and with its upper end portion closed by a top plate 2b.

Also, the four air introduction pipes, i.e., the first to fourth air introduction pipes 5a to 5d, are connected to a lower flank of the furnace body 2 by being laid so as to slope downward with their center line forming an angle in a range of 55 to 65° with a horizontal plane.

With the first to fourth air introduction pipes 5a to 5d, centers of the respective suction ports are placed on a same circumference, and are placed sequentially clockwise at substantially equal intervals in a circumferential direction in a planar view from a viewpoint of equally supplying air to a furnace bottom. Incidentally, the centers of the suction ports of the first to fourth air introduction pipes 5a to 5d are placed at a height of 1500 to 2500 mm in terms of dimensions (H of FIG. 1) above the fluidizing air blowing port 2a and gas flow velocity in the air introduction pipes 5a to 5d are generally set at 15 to 18 m/s.

Figure 7:
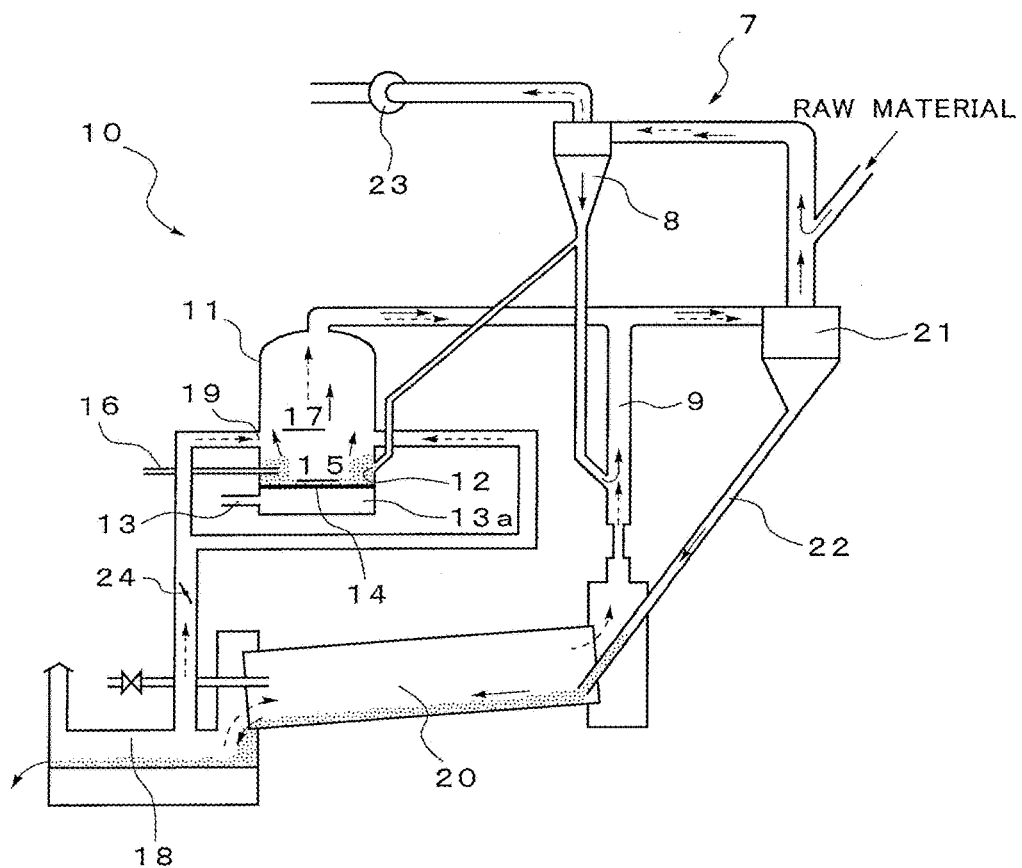
FIG. 7 is a schematic configuration diagram showing a cement manufacturing facility equipped with a conventional fluidized calciner.

Also, the fluidizing air blowing port 2a is configured such that air will be blown into the furnace body 2 through an air chamber 13a and air dispersion plate 14, for example, as with the cement manufacturing facility equipped with the conventional fluidized calciner 11 shown in FIG. 7. Note that according to the present embodiment, the air dispersion plate 14 is disposed in a horizontal direction. Also, a blow rate of the fluidizing air through the fluidizing air blowing port 2a depends on a raw material concentration and particle size distribution and is set at 1.0 to 2.0 m/s in the case of typical cement raw material.

Then, the exhaust gas duct 6 is connected to a top side wall of the furnace body 2 located above the first and second air introduction pipes 5a and 5b. The exhaust gas duct 6 is laid so as to slope upward with increasing distance from the furnace body 2 and connected such that an upper side wall 6a will be positioned spaced away from the top plate 2b. Consequently, a mixing chamber C is formed between a connecting portion of the top plate 2b and the exhaust gas duct 6.

Also, the raw material chute 4 is placed next to the first air introduction pipe 5a or second air introduction pipe 5b (first air introduction pipe 5a, according to the present embodiment) and connected to a side wall of the furnace body 2, sloping downward at an angle in a range of roughly 50 to 70° with respect to a horizontal plane. Here, a center of a loading port of the raw material chute 4 varies with processing capacity of the fluidized calciner, and is placed at a height of roughly 1500 to 3000 mm in terms of dimensions (h of FIG. 1) above the fluidizing air blowing port 2a. Note that a stand 4a used for dispersion of raw material and made of a refractory is placed below the loading port of the raw material chute 4 as shown in FIG. 3(a).

Plural pulverized coal blowing lines 3 (two blowing lines in FIGS. 3(a) to 3(e) and four blowing lines in FIG. 3(f)) adapted to blow in pulverized coal, such as coal or coke, which is a fuel, into the furnace body 2 are disposed. Blowing ports 3a of the plural pulverized coal blowing lines 3 are disposed below the suction ports of the respective air introduction pipes 5a to 5d but above the fluidizing air blowing port 2a, and at least one of the blowing ports 3a is placed below the third or fourth air introduction pipe 5c or 5d.

The pulverized coal blowing lines 3 are each connected to the furnace body 2 perpendicularly to an axis of the furnace body 2 so as to blow in pulverized coal toward a center of the furnace body 2 and, moreover, disposed in such a way that centers of the blowing ports 3a will be positioned, for example, on a same line as centers of the air introduction pipes 5a to 5d in a vertical direction. Note that carrier air flow rate for the pulverized coal in the pulverized coal blowing lines 3 is an adjustment item in operation and is normally set to a range of 10 to 20 m/s.

The fluidized calciner 1 configured as described above has been attained through computational fluid dynamics (CFD) calculations carried out by the inventors to find that a flow of pulverized coal blown in from the pulverized coal blowing lines 3 is affected by a flow of raw material loaded from the raw material chute 4, a flow of gas from the air introduction pipes 5a to 5d, and an exhaust flow of combustion gas in the furnace body 2 containing cement raw material and pulverized coal, where the exhaust flow depends on a connecting location of the exhaust gas duct 6.

The computational fluid dynamics calculations described above involve quantifying geometry and operating conditions of an actual fluidized calciner numerically calculating gas flow, particle movement, chemical reactions, and heat transfer using a computer with an analysis program installed thereon, and thereby grasping a situation of combustion and calcination in the fluidized calciner using computer graphics, where the situation is difficult to grasp through actual measurements. Note that effects of introduced air on the flow of micronized coal are the same both in the case of blowing and suction of the introduced air with respect to the air introduction pipes 5.

Methods and models for the computational fluid dynamics calculations are as follows:
(1) Computational fluid dynamics calculation software: Rflow (R-flow Corporation Ltd.)
(2) Turbulence model: k-ε Model
(3) Fluid: incompressible ideal gas
(4) Pressure-velocity coupling: SIMPLE
(5) Discretization scheme: Finite Volume Method
(6) Momentum: Second Order Upwind
(7) Turbulent kinetic energy: First Order Upwind
(8) Turbulence dissipation rate: First Order Upwind
(9) Energy: Second Order Upwind
(10) Particle analysis: Discrete Element Method
(11) Particle-fluid interaction: Two Way Coupling
(12) Pulverized coal combustion: $H_2+O_2-H_2O$, $CH_4+O_2-H_2O+CO_2$, $CO+O_2-CO_2$, $C+O_2-CO_2$
(13) Raw material decarbonation model: $CaCO_3-CaO+CO_2$, Unreacted Core Model.

Note that all (2) to (13) are general-purpose models used widely by those skilled in the art, where (2) to (11) are used in conducting computational fluid analysis on gas flow and the like, (12) used in conducting combustion analysis, and (13) is used in analyzing decarbonation reaction of limestone.

Also, the composition of the coal used in the computational fluid dynamics calculations is as follows.

| Name | Amount of heat generation (Kcal/Kg) | Volatile matter (%) | Fixed carbon (%) | Water content (%) | Ash content (%) |
| --- | --- | --- | --- | --- | --- |
| Bituminous coal | 6700 | 34.3 | 49.4 | 6.8 | 9.5 |

Note that when the type of pulverized coal was changed, in addition to changing the industrial analytical values listed above, the feed rate of the pulverized coal was adjusted as well to keep the total amount of heat generated by the pulverized coal loaded into the calciner constant.

Furthermore, regarding operating conditions of the actual furnace, such as cement raw material input, flow velocity, and temperature, for example, the following data was used.

Furnace body 2
  Furnace inner diameter=5.1 m
  Furnace length=14 m
Pulverized coal blowing line 3
  Feed rate of pulverized coal=9.1 t/h
  Carrier air flow rate=11 m/s
  Temperature=50° C.
Raw material chute 4
  Cement raw material: 272 t/h
  Temperature=740° C.
  Carrier air flow rate=0.5 m/s
Air introduction pipe 5 (placed at four locations in circumferential direction)
  Introduced air
  Temperature=880° C.
  Flow velocity=16.5 m/s
Fluidizing air blowing port 2a
  Fluidizing air
  Temperature=800° C.
  Flow velocity=1.64 m/s

EXAMPLES

Example A

In Example A, in relation to Examples 1 to 6 in which the blowing ports 3a of plural pulverized coal blowing lines 3 such as shown in FIGS. 3(a) to 3(f) were disposed below the suction ports of the respective air introduction pipes 5a to 5d but above the fluidizing air blowing port 2a and at least one of the blowing ports 3a was placed below the third or fourth air introduction pipe 5c or 5d, the char reaction rate (%), the decarbonation rate (%) of cement raw material particles, oxygen concentration (%), the particle temperature (° C.) of cement raw material, and gas temperature (° C.) were calculated through computational fluid dynamics calculations based on the geometry and operating conditions of the actual furnace described above.

Note that in Example 1 (FIG. 3(a)), the blowing ports 3a of two pulverized coal blowing lines 3 were placed below the first and third air introduction pipes 5a and 5c, respectively, in Example 2 (FIG. 3(b)), the blowing ports 3a of two pulverized coal blowing lines 3 were placed below the second and third air introduction pipe 5b and 5c, respectively, and in Example 3 (FIG. 3(c)), the blowing ports 3a of two pulverized coal blowing lines 3 were placed below the third and fourth air introduction pipe 5c and 5d, respectively.

Also, in Example 4 (FIG. 3(d)), the blowing ports 3a of two pulverized coal blowing lines 3 were placed below the second and fourth air introduction pipe 5b and 5d, respectively, in Example 5 (FIG. 3(e)), the blowing ports 3a of two pulverized coal blowing lines 3 were placed below the first and fourth air introduction pipe 5a and 5d, respectively, and in Example 6 (FIG. 3(f)), the blowing ports 3a of four pulverized coal blowing lines 3 were placed below the first to fourth air introduction pipes 5a to 5d, respectively.

Furthermore, as comparative examples, in relation to Comparative Examples 1 to 5 in which the blowing ports 3a of the pulverized coal blowing lines 3 were placed below the suction ports of the respective air introduction pipes 5a to 5d and at locations shown in FIGS. 4(a) to 4(e), the char reaction rate (%), the decarbonation rate (%) of cement raw material particles, oxygen concentration (%), the particle temperature (° C.) of cement raw material, and gas temperature (° C.) were calculated similarly through the computational fluid dynamics calculations based on the geometry and operating conditions of the actual furnace described above.

Specifically, in Comparative Example 1 (FIG. 4(a)), the blowing port 3a of one pulverized coal blowing line 3 was placed below the second air introduction pipe 5b, in Comparative Example 2 (FIG. 4(b)), the blowing port 3a of one pulverized coal blowing line 3 was placed below the third air introduction pipe 5c, and in Comparative Example 3 (FIG. 4(c)), the blowing port 3a of one pulverized coal blowing line 3 was placed below the fourth air introduction pipe 5d.

Also, in Comparative Example 4 (FIG. 4(d)), the blowing port 3a of one pulverized coal blowing line 3 was placed below the first air introduction pipe 5a and in Comparative Example 5 (FIG. 4(e)), the blowing ports 3a of two pulverized coal blowing lines 3 were placed below the first and second air introduction pipe 5a and 5b, respectively.

Here, the decarbonation rate (%) of the cement raw material is a weighted average calculated by weighting the decarbonation rate of each raw material particle at the calciner outlet according to the mass before calcination and the char reaction rate (%) is a weighted average calculated by weighting the char reaction rate of each pulverized coal particle at the calciner outlet according to the mass of the char before reaction. Note that the performance of calciner is evaluated as being high when the average char reaction rate (%) is 60% or above and when the decarbonation rate (%) of the cement raw material is 45% or above.

Table 1 is a chart showing results of computational fluid dynamics calculations in the layouts of FIG. 3, where the results show the average values at the outlet of the exhaust gas duct 6 in Examples 1 to 6 above. Also, Table 2 is a chart showing results of computational fluid dynamics calculations in the comparative examples of FIG. 4, where the results show the average values at the outlet of the exhaust gas duct 6 in Comparative Examples 1 to 5 above.

TABLE 1

| Blowing port | FIG. 3 | Char reaction rate (%) | Decarbonation rate (%) of raw material particles | Oxygen concentration (%) | $CO_2$ concentration (%) | Raw material particle temperature (° C.) | Gas temperature (° C.) |
|---|---|---|---|---|---|---|---|
| Example 1 | (a) | 70.0 | 48.2 | 5.6 | 25.3 | 889.9 | 919.2 |
| Example 2 | (b) | 67.2 | 46.3 | 6.3 | 24.4 | 885.2 | 909.0 |
| Example 3 | (c) | 63.6 | 45.0 | 6.4 | 23.7 | 884.9 | 917.2 |
| Example 4 | (d) | 63.1 | 45.3 | 6.5 | 23.9 | 882.0 | 905.1 |
| Example 5 | (e) | 60.1 | 46.1 | 6.0 | 24.2 | 884.7 | 910.7 |
| Example 6 | (f) | 69.4 | 48.7 | 5.5 | 25.4 | 887.9 | 909.2 |

TABLE 2

Figure 4:
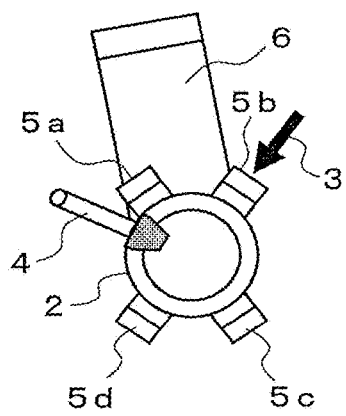
Figure 4:
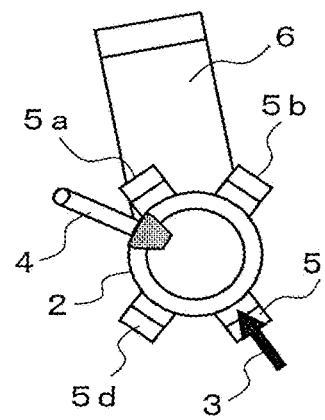
Figure 4:
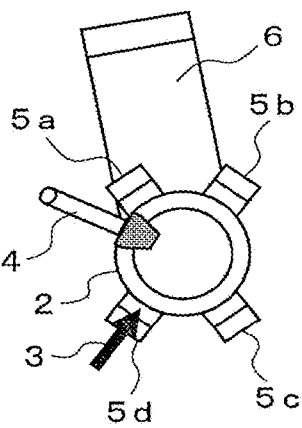
Figure 4:
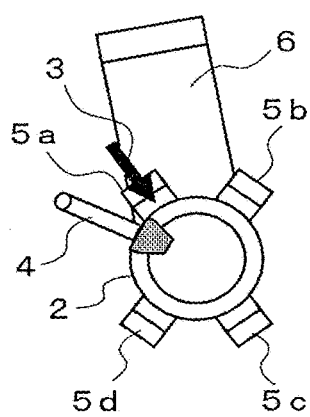
Figure 4:
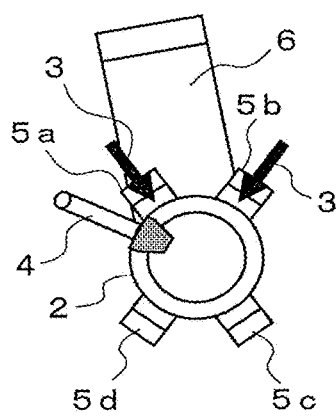

| Blowing port | FIG. 4 | Char reaction rate (%) | Decarbonation rate (%) of raw material particles | Oxygen concentration (%) | $CO_2$ concentration (%) | Raw material particle temperature (° C.) | Gas temperature (° C.) |
|---|---|---|---|---|---|---|---|
| Comparative Example 1 | (a) | 52.5 | 41.3 | 7.9 | 21.6 | 874.8 | 896.2 |
| Comparative Example 2 | (b) | 48.2 | 43.6 | 7.5 | 21.7 | 878.3 | 900.6 |
| Comparative Example 3 | (c) | 53.8 | 44.9 | 6.3 | 24.1 | 883.8 | 913.1 |
| Comparative Example 4 | (d) | 53.2 | 44.8 | 7.7 | 22.1 | 879.3 | 906.4 |
| Comparative Example 5 | (e) | 52.5 | 42.2 | 7.9 | 21.3 | 875.5 | 900.9 |

As can be seen in FIG. 4 and Table 2, in any of Comparative Examples 1 to 4, since pulverized coal was blown into the furnace body 2 through the blowing port 3a of the pulverized coal blowing line 3 provided at one location, regardless of where the location was, the pulverized coal was not dispersed sufficiently in the furnace body 2 and flowed toward the exhaust gas duct 6.

Consequently, oxygen becomes deficient in locations where the concentration of pulverized coal is high while conversely becoming excessive in locations where the concentration is low, causing uneven oxygen consumption and thus incomplete combustion in the furnace, and resulting in a reduced char reaction rate. Thus, it can be seen that the average char reaction rate (%) was less than 54% in all cases and that the decarbonation rate (%) of the cement raw material was less than 45%.

Figure 5:
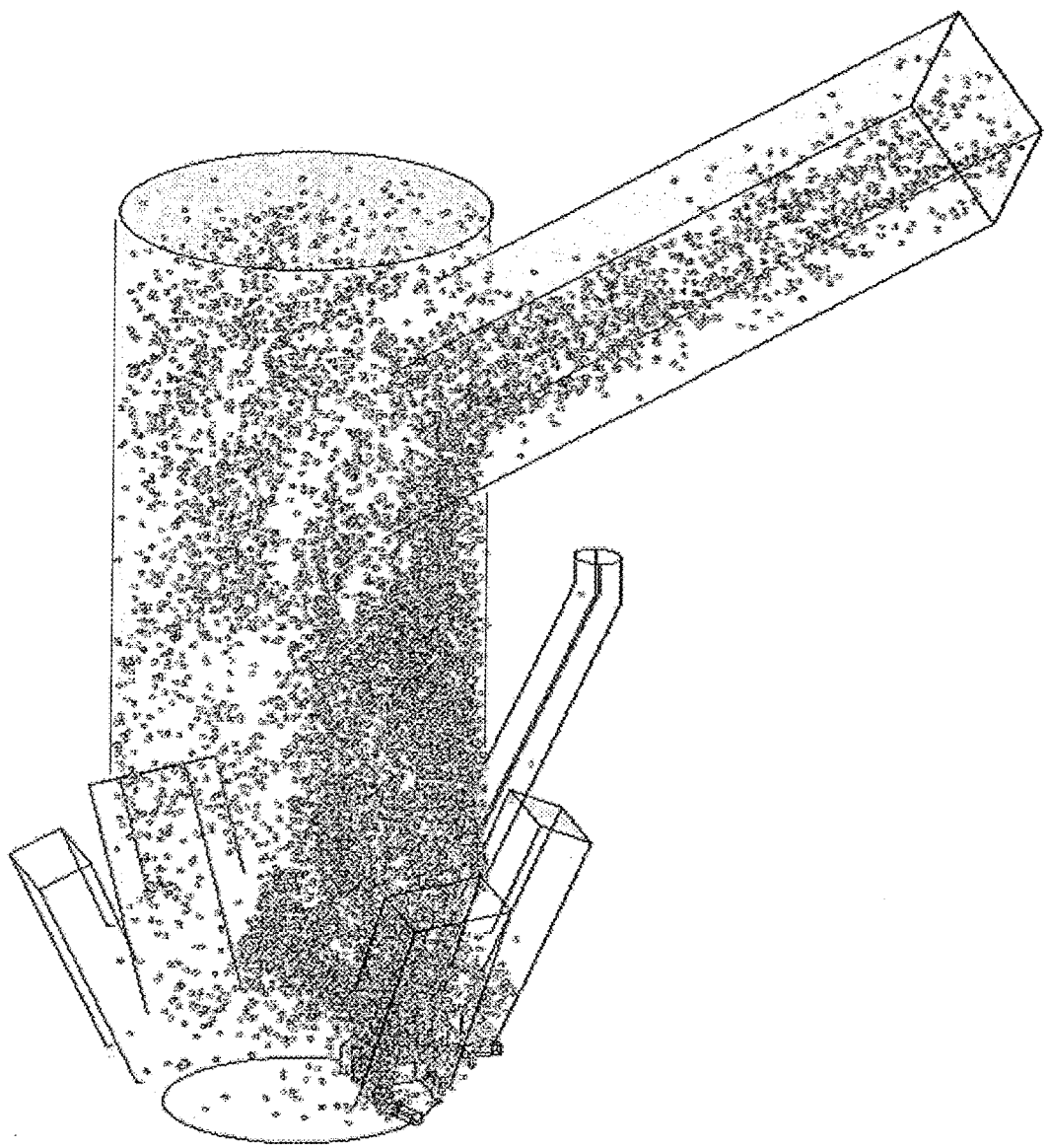
FIG. 5 is an in-furnace pulverized coal concentration distribution map in Comparative Example 5 of FIG. 4 resulting from computational fluid dynamics calculations described above.

Also, in Comparative Example 5, although pulverized coal was blown into the furnace body 2 from the pulverized coal blowing ports 3a at two locations, since the blowing ports 3a were placed below the first and second air introduction pipes 5a and 5b located below the exhaust gas duct 6, the distribution of the pulverized coal loaded through the blowing ports 3a became uneven as shown in FIG. 5 and the pulverized coal increased in concentration on the side of the side wall to which the exhaust duct was connected and just flowed toward the exhaust gas duct 6. Consequently, it can be seen that compared to Comparative Examples 1 to 4 in which pulverized coal was blown in from one location, there was no improvement in dispersion effect of the pulverized coal.

In contrast, as can be seen in FIG. 3 and Table 1, in Examples 1 to 6 of the present invention, since the pulverized coal blowing ports 3a of the pulverized coal blowing lines 3 were provided in plural locations (two locations in Examples 1 to 5 and four locations in Example 6) and one of the pulverized coal blowing ports 3a was placed below the air introduction pipe 5c and/or air introduction pipe 5d spaced away from the position where the exhaust gas duct 6 was connected, the pulverized coal was able to be dispersed effectively in the furnace, improving combustion.

This improves dispersibility of the pulverized coal in the furnace body 2, makes oxygen consumption uniform, facilitates combustion, increases gas temperature, and increases the decarbonation rate of cement raw material. Consequently, it can be seen that average char reaction rate (%) of 60% or above was available in all the examples and that the decarbonation rate (%) of the cement raw material was 45% or above.

Also, when Examples 1 to 5 and Example 6 are compared, if the blowing ports 3a are placed at two locations by placing at least one of the blowing ports 3a below the air introduction pipe 5c and/or air introduction pipe 5d spaced away from the position where the exhaust gas duct 6 is connected, it is possible to obtain effects substantially equivalent to when blowing ports are placed at four locations. Thus, it can be seen that when equipment cost and ease of management are considered, sufficient effects can be obtained if the blowing ports 3a are placed at two locations.

Furthermore, according to the results of Example 1, when the raw material chute 4 is placed next to the first air introduction pipe 5a below the exhaust duct 6 in a planar view, if the pulverized coal blowing ports 3a are placed below the first air introduction pipe 5a and below the third air introduction pipe 5c opposed to the first air introduction pipe 5a in a radial direction of the furnace body 2, the decarbonation rate of the cement raw material as well as the char reaction rate can be improved further. Note that when the raw material chute 4 is placed next to the second air introduction pipe 5b and the pulverized coal blowing ports 3a are placed below the second air introduction pipe 5b and below the fourth air introduction pipe 5d opposed to the second air introduction pipe 5b in the radial direction of the furnace body 2, similar effects can be obtained.

Example B

Figure 2:
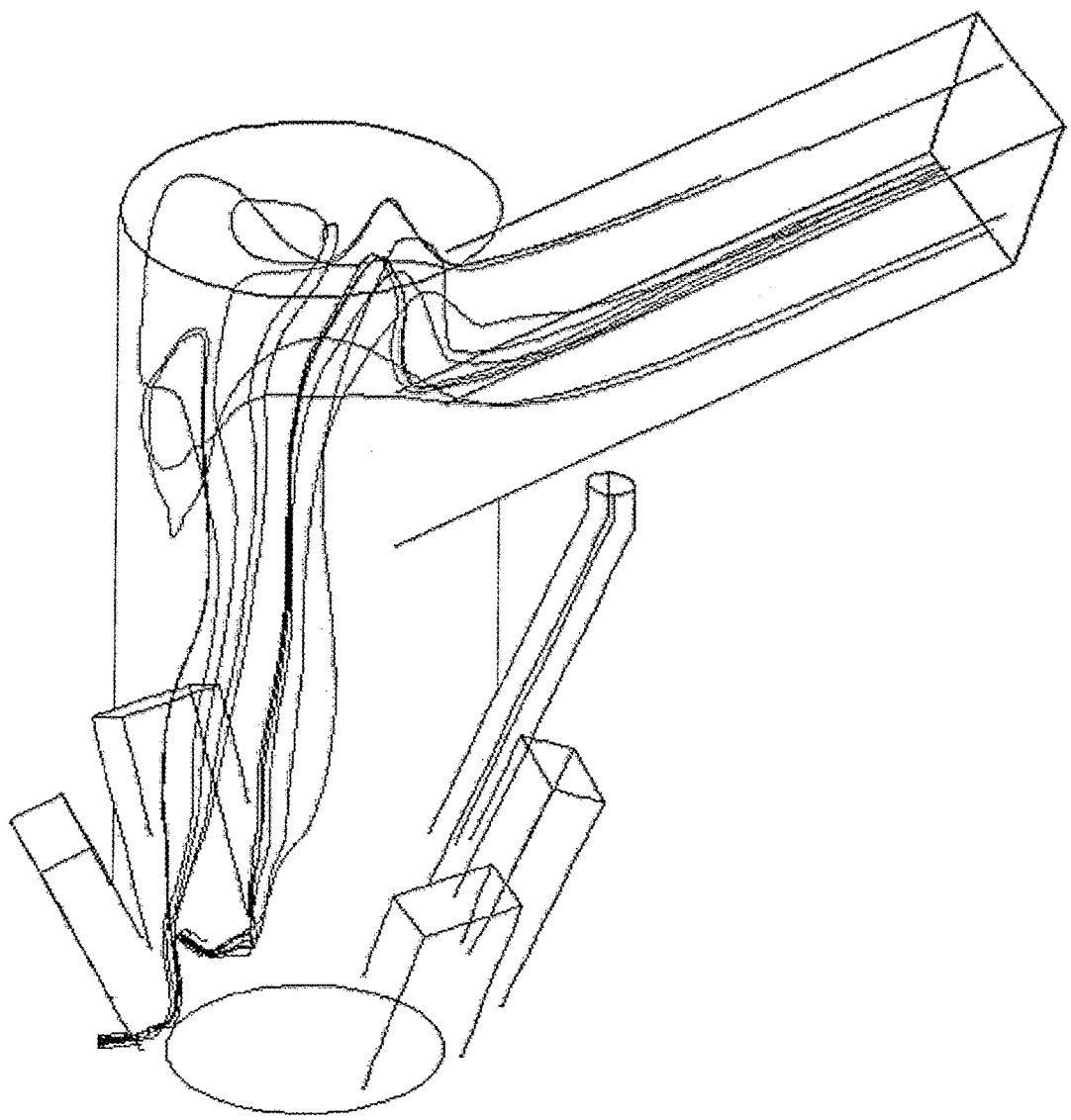
FIG. 2 is a perspective view showing major trajectories of pulverized coal particles in the fluidized calciner of FIG. 1.

FIG. 2 shows major trajectories of pulverized coal particles in a fluidized calciner with a configuration of Example 3, where the trajectories have been obtained using computational fluid dynamics calculations based on the geometry and operating conditions of an actual furnace similar to that of Example A.

As described above, in the fluidized calciner according to the present invention, the upper end portion of the cylindrical furnace body 2 is closed by the top plate 2b and the exhaust gas duct 6 is connected to the upper side wall of the furnace body 2 by being spaced away from the top plate 2b, and thereby the mixing chamber C for a mixed fluid of cement raw material, pulverized coal, and furnace gas flowing to the exhaust gas duct is formed in upper part of the furnace body 2.

Consequently, as seen in FIG. 2, because the flow in the mixing chamber C is complicated, combustion quality can be improved by facilitating mixing of the furnace gas and pulverized coal. Thus, as shown in Example A, heat exchange among the cement raw material, pulverized coal, and furnace gas is also facilitated by the mixing, making it possible to improve the decarbonation rate of the cement raw material.

Comparative Examples

Figure 6:
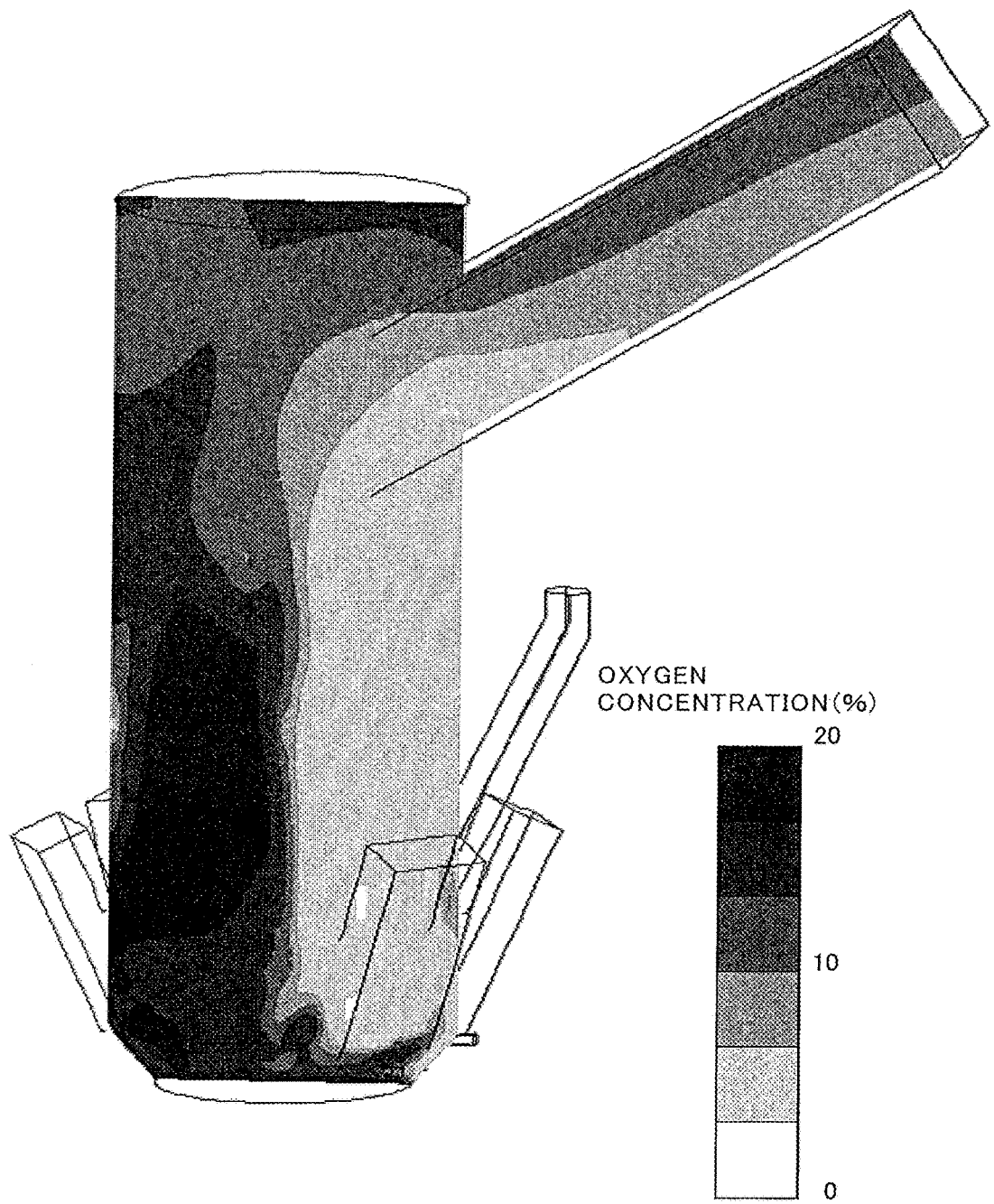
FIG. 6 is an in-furnace oxygen concentration distribution map in Comparative Example 5 of FIG. 4 resulting from computational fluid dynamics calculations described above.

On the other hand, FIGS. 5 and 6 show results obtained by analyzing a particle distribution and oxygen concentration distribution in the furnace body 2 with the pulverized coal blowing ports 3a placed as shown in Comparative Example 5, where the analysis has been conducted using computational fluid dynamics calculations based on the geometry and operating conditions of an actual furnace similar to that of Example A.

As seen in FIG. 5, in Comparative Example 5, although pulverized coal is blown into the furnace body 2 from the pulverized coal blowing ports 3a at two locations, since the blowing ports 3a are placed below the first and second air introduction pipes 5a and 5b located below the exhaust gas duct 6, the distribution of the pulverized coal loaded through the blowing ports 3a becomes uneven and the pulverized coal increases in concentration on the side of the side wall to which the exhaust gas duct is connected and just flows toward the exhaust gas duct 6. Consequently, the pulverized coal is not dispersed sufficiently.

Consequently, as can be seen in FIG. 6, oxygen becomes deficient (low in concentration) in locations where the concentration of pulverized coal is high while conversely becoming excessive (high in concentration) in locations where the concentration is low, causing uneven oxygen consumption and thus incomplete combustion in the furnace, and resulting in a reduced char reaction rate. Thus, it can be seen that the decarbonation rate falls, making a sufficient improvement effect unavailable compared to Comparative Examples 1 to 4 in which pulverized coal is blown in from one location.

INDUSTRIAL APPLICABILITY

The present invention provides a fluidized calciner which can perform sufficient calcination by reducing the rate of unburned fuel at the outlet of the fluidized calciner while preventing occlusion in a preheater.

REFERENCE SIGNS LIST

1 Fluidized calciner
2 Furnace body
2a Fluidizing air blowing port
2b Top plate
3 Pulverized coal blowing line
3a Blowing port
4 Raw material chute
5a-5d First to fourth air introduction pipe
6 Exhaust gas duct

The invention claimed is:

1. A fluidized calciner, wherein:
   a plurality of pulverized coal blowing lines adapted to blow fuel into a furnace body cylindrical in shape, a raw material chute adapted to load cement raw material into the furnace body, and first to fourth air introduction pipes placed sequentially at intervals and adapted to provide introduced air into the furnace body are connected to a bottom side wall of the furnace body whose axis direction corresponds to an up-down direction and whose upper end portion is closed by a top plate;
   a fluidizing air blowing port adapted to blow fluidizing air into the furnace body is disposed at a bottom of the furnace body;
   an exhaust duct adapted to cause combustion gas in the furnace body containing cement raw material to flow out is connected to a top side wall of the furnace body located above the first and/or second air introduction pipes by being spaced away from the top plate;
   blowing ports of the pulverized coal blowing lines are disposed below suction ports of the respective air introduction pipes but above the fluidizing air blowing port; and
   one of the blowing ports is placed below the third or fourth air introduction pipe.

2. The fluidized calciner according to claim 1, wherein the blowing ports of the pulverized coal blowing lines are disposed at two locations.

3. The fluidized calciner according to claim 1, wherein the raw material chute is placed next to the first air introduction pipe and the blowing ports are placed below the third air introduction pipe opposed to the first air introduction pipe in a radial direction.

4. The fluidized calciner according to claim 2, wherein the raw material chute is placed next to the first air introduction pipe and the blowing ports are placed below the third air introduction pipe opposed to the first air introduction pipe in a radial direction.

* * * * *